March 7, 1950 W. V. WOLFE 2,499,618

PLURAL TRACK SOUND REPRODUCTION

Filed March 8, 1946

INVENTOR

WALLACE V. WOLFE,

BY Carl R. Gorham

ATTORNEY

Patented Mar. 7, 1950 2,499,618

UNITED STATES PATENT OFFICE 2,499,618

PLURAL TRACK SOUND REPRODUCTION

Wallace V. Wolfe, Beverly Hills, Calif., assignor to Radio Corporation of America, a corporation of Delaware Application March 8, 1946, Serial No. 652,921

6 Claims. (Cl. 179—100.3)

Figures 1, 2:
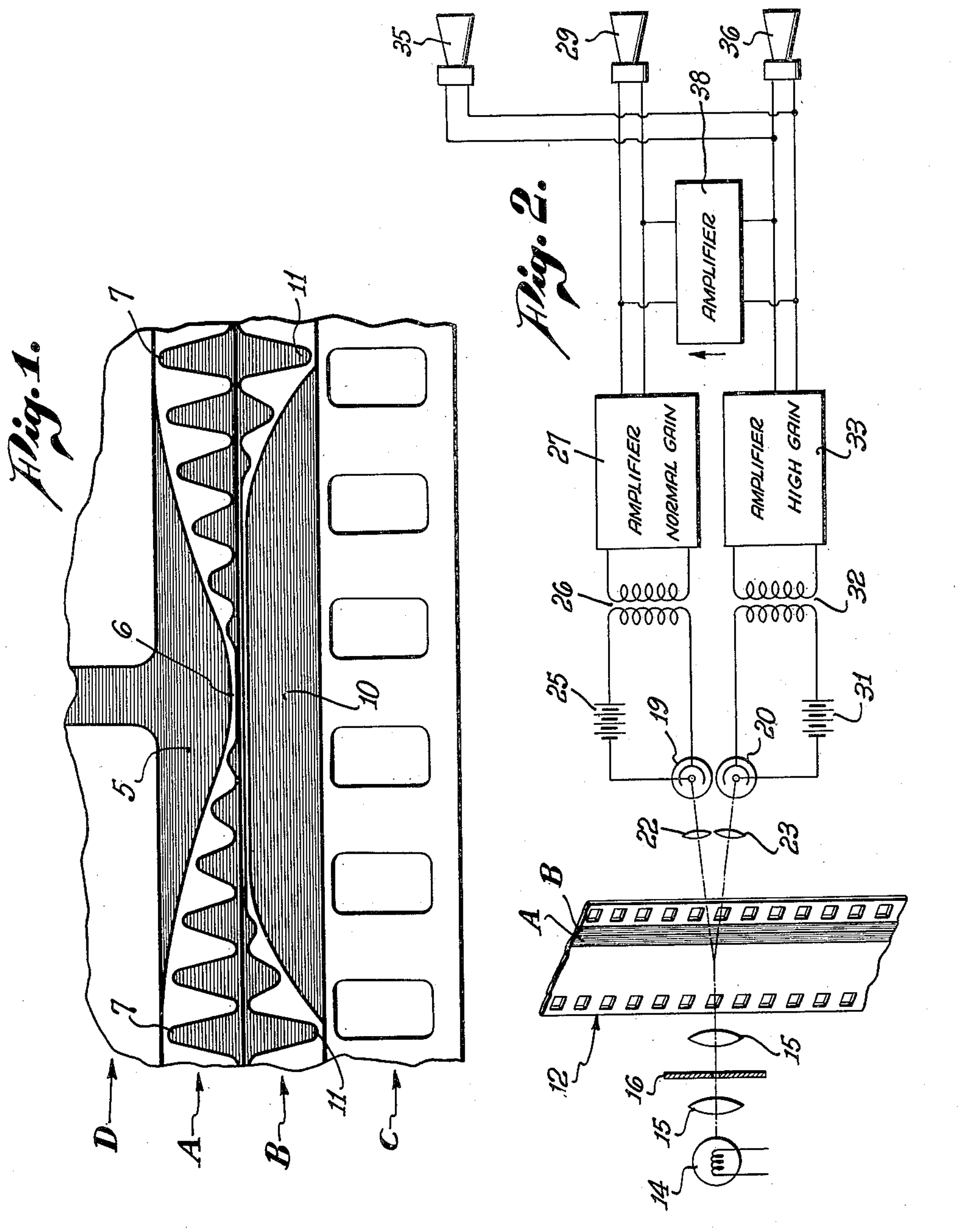

This invention relates to sound recording and reproducing systems, and particularly to film sound record reproducing systems.

In the sound recording and reproducing art, it is well-known that the width of the sound track area and the nature of the film emulsion limit the range which may be recorded and normally reproduced from a film sound record. The width of the sound track limits the upper level, and the grain structure of the film emulsion limits the lower level. To permit a lower level to be recorded, "squeeze" tracks have been suggested and used, one such track being disclosed and claimed in Livadary U. S. Patent No. 2,239,505 of April 22, 1941. To increase the upper reproducible level, without increasing the sound track width, several control track systems have been suggested, one of which is disclosed in Burrill U. S. Patent No. 2,270,260 of January 20, 1942. Another system for increasing the upper level is one in which the sound track area is divided into two longitudinal strips, one strip being given a certain amplification during reproduction, and the other half, an increased amplification during reproduction. Such a system is disclosed in Morgan U. S. Patent No. 2,332,333 of October 19, 1943.

In the art of sound reproduction, particularly in theaters, it has been found desirable, in cases where an increased range or high levels are employed, that the sound not only be increased in level, but be distributed among several speakers on either side of the center speaker, the latter being behind the screen. That is, using only a single speaker, the high level of reproduction now used in theaters has reached its limit, and if higher levels are to be used, the sound should be reproduced by additional speakers. Control track systems for producing high levels of the reproduced sound and for distributing the sound among several speakers are shown in Bierwirth U. S. Patent No. 2,335,575 of November 30, 1943 and Mueller U. S. Patent No. 2,361,490 of October 31, 1944.

The present invention, however, provides a system wherein only the sound track area is used to obtain a wider amplitude range of reproduction; a lower recordable level is obtained by use of the "squeeze" track principle; a higher level is obtained by variably amplifying the two portions of the signal during reproduction; and reproduction of the increased level is efficaciously reproduced in a plurality of speakers. The present invention, therefore, more effectively utilizes the increased range of amplitude while obtaining it without the use of a track or record in addition to that in the normal sound track area.

The principal object of the invention, therefore, is to facilitate the recording and reproducing of sound records.

Another object of the invention is to provide an improved method of and system for reproducing sound from film sound records.

A further object of the invention is to provide an improved system for increasing the normal reproducible range of a sound record and distributing said reproduced sound more efficaciously.

A still further object of the invention is to provide an improved amplitude control and sound distribution system for theaters in the presentation of sound pictures.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a view of a section of a sound picture film in accordance with the invention, and Fig. 2 is a schematic drawing of a sound reproducing system embodying the invention.

Referring now to Fig. 1, it is noted that the normal sound track area is divided into two longitudinal sections A and B, the film having a sprocket hole section at C and a picture section shown partially at D. The section A of the sound track represents a normal sound track section of the unilateral variable area type wherein noise reduction is shown by an opaque portion 5, no signal by a section 6, and maximum signal by modulations 7. Although the type of sound track shown is a unilateral variable area track, it is to be understood that a bilateral variable area track, a variable density track, or any type of track may also be employed. The track section B is similar to that of section A, having a noise reduction portion 10 and a maximum modulated portion at 11. In recording the sections A and B, the normal signal including low musical passages and dialogue will all be recorded in section A, but for higher levels of music and background effects, section B will also be used in addition to section A. That is, two separate modulators may be employed, one for recording the track of section A, and the other for recording the track of section B, the section B modulator being biased to a predetermined signal level.

Although it is not necessary that all dialogue be recorded in section A, it is preferred, because this arrangement permits all the dialogue to be reproduced behind the picture screen, and the gain of the center speaker channel or the level of reproduction in the center speaker can be set to provide the desired maximum dialogue level at this point. It has been found that spreading the dialogue among several speakers destroys the illusion of synchronism between the depicted source of sound and the actual sound source.

To reproduce a track of the type shown in Fig. 1, the circuit shown in Fig. 2 may be employed. In this circuit, the film 12 having the sound track sections A and B thereon is passed between a light source 14, an optical system including lenses 15 and a slit mask 16, and a pair of individual photoelectric cells 19 and 20, or the well-known type of push-pull photocell. The emergent beams from the sound track sections A and B are projected on the cells 19 and 20 by respective lenses 22 and 23. The photocell 19 is connected through an energy source 25 and transformer 26 to an amplifier 27 having normal gain, this amplifier being connected to a speaker 29 which may be the center speaker behind the screen in a motion picture theater.

The photocell 20 is connected through an energy source 31 and a transformer 32 to an amplifier 33 which may have a gain in the neighborhood of 20 db higher than that of amplifier 27, amplifier 33 being connected to speakers 35 and 36 which may be located on either side of the speaker 29. Interconnecting the output of amplifier 33 and the output of amplifier 27 is an amplifier 38 which will transmit signals in the output of amplifier 33 to the center speaker 29, but not vice versa, as shown by the arrow.

In the operation of such a reproducing system, the amplifier 27 is adjusted to produce in speaker 29 the proper maximum dialogue level for a certain theater. That is, while the signal is made up solely of dialogue and low level background signals, these will all be reproduced in speaker 29, since they are all on section A of the sound track. However, when high level musical effects, such as a symphony orchestra, or sound effects, such as earthquakes, fires, etc., are to be reproduced, sound track section B will feed signals to amplifier 33 which will not only feed the side speakers 35 and 36, but, through amplifier 38, will increase the output from speaker 29 to maintain the proper balance and distribution of these sounds to the audience. It is realized that during these high level passages, there is generally no dialogue, and both sections A and B of the sound track area will provide the signal. However, since the amplifier 33 has increased gain, and the reproduction of the sound on the center speaker 29 is limited to the normal gain of amplifier 27, it is necessary that further input to the center speaker be provided to maintain the proper distribution.

Thus, with the above type of system, not only is an increased range obtainable from the normal sound track area of a motion picture film both by lowering the lower recordable limit and by increasing the upper reproducible limit, but the increased volume range can be fully and effectively utilized by properly distributing the sound in the theater. If only a center speaker is used with the increased volume range, the desired effect thereof could not be appreciated inasmuch as the special sound effects should be initiated over a wider area in order to enhance the effect desired.

This reproducing system is especially adapted to the reproduction of a singer or singers and the accompanying music. In this event, section A is used only for the singer's voice, which is reproduced in the center speaker only, and section B is used for the accompanying music, which is reproduced in all three speakers. By so recording and reproducing the singer and music, intermodulation between the dialogue and music, which frequently occurs in signals of this type, is prevented.

I claim:

1. A sound reproducing system, comprising a sound track having at least two sections, the first of said sections having dialogue and low level background effects recorded thereon, and the second of said sections having higher level background effects only recorded thereon, a sound reproducing channel for the first of said track sections, the said channel including a pickup device, a speaker and an amplifier having a fixed gain, a second channel for the second of said sound track sections for reproducing sound at a higher fixed gain than the said first channel, the said second channel including a second pickup device, a second amplifier, and another speaker, and means for transferring a certain amount of energy in said first channel to said second channel at a fixed gain.

2. A sound reproducing system in accordance with claim 1, in which said last mentioned means includes a fixed gain amplifier having its input connected to the output of said second mentioned amplifier and its output connected to the output of said first mentioned amplifier.

3. Apparatus for reproducing a signal composed of dialogue, music and sound effects, comprising a channel reproducing the dialogue at a predetermined fixed gain at a certain first point, said channel including a pickup device, an amplifier and a first speaker, a second channel separately reproducing only high level music and sound effects at a second predetermined fixed gain higher than the first said gain at another point acoustically associated with said first point, said second channel including a second pickup device, a second amplifier and a second speaker, and a third channel including an amplifier associated with both of said channels for transferring a predetermined portion of said music and sound effects to said first point at a fixed gain.

4. Apparatus for reproducing a signal composed of dialogue and background sounds, comprising in combination a channel reproducing said dialogue at a first fixed gain at a certain point, said channel including a pickup device, an amplifier and a speaker, a second channel reproducing only high level background sounds at a higher fixed gain than said first fixed gain at a second point, said second channel including a second pickup device, a second amplifier and a second speaker, and a third channel connected to said second channel for transferring a portion of said background sounds to said first point for reproduction at a predetermined ratio with respect to the gain of reproduction at said first and second points.

5. A sound reproducing system for a signal composed of dialogue, music, and sound effects to be reproduced at different points, said system comprising a plurality of speakers, a device having sound recorded thereon, the said device having two sound tracks, the first of said tracks having dialogue, low level music and sound effects recorded thereon to be reproduced on one of said speakers only and the second of said sound tracks having only high levels of said music and sound effects recorded thereon to be reproduced on all of said speakers, a reproducing channel for said first sound track including a pickup device, one of said speakers, and an amplifier having a fixed gain, and a second reproducing channel for said second sound track including a pickup device, an amplifier having a higher fixed gain than said first mentioned amplifier and connections from said last mentioned amplifier to all of said speakers.

6. A reproducing system in accordance with claim 5, in which said last mentioned connections include a third amplifier having its input connected to the output of said second mentioned amplifier and its output connected to the output of said first mentioned amplifier, said third mentioned amplifier having a predetermined fixed gain.

WALLACE V. WOLFE.

REFERENCES CITED

The following references are of record in the file of this patent:

UNITED STATES PATENTS

| Number | Name | Date |
|---|---|---|
| 2,114,019 | Friebus | Apr. 12, 1938 |
| 2,273,866 | Holst | Feb. 24, 1942 |
| 2,299,410 | Reiskind | Oct. 20, 1942 |
| 2,314,382 | Batsel | Mar. 23, 1943 |
| 2,322,435 | Goshaw | June 22, 1943 |
| 2,332,333 | Morgan | Oct. 19, 1943 |
| 2,335,575 | Bierwirth | Nov. 30, 1943 |
| 2,361,490 | Mueller | Oct. 31, 1944 |
| 2,402,095 | Slyfield | June 11, 1946 |